United States Patent [19]
Johnson

[11] Patent Number: 5,267,139
[45] Date of Patent: Nov. 30, 1993

[54] ZEE PARAMETER ESTIMATOR/IDENTIFIER

[76] Inventor: Carroll D. Johnson, 4001 Granada Dr., SE., Huntsville, Ala. 35802

[21] Appl. No.: 720,610

[22] Filed: Jun. 25, 1991

[51] Int. Cl.$^5$ .............................................. G05B 13/02
[52] U.S. Cl. ..................................... 364/148; 364/152
[58] Field of Search ............ 364/148, 152, 157, 724.17

[56] References Cited
U.S. PATENT DOCUMENTS

| | | | |
|---|---|---|---|
| 4,188,667 | 2/1980 | Graupe et al. | 364/724.17 |
| 5,038,269 | 8/1991 | Grimble et al. | 364/148 |
| 5,043,863 | 8/1991 | Bristol et al. | 364/157 |

*Primary Examiner*—Jerry Smith
*Assistant Examiner*—Steven R. Garland
*Attorney, Agent, or Firm*—Robert W. Bass

[57] ABSTRACT

In an improved Parameter Estimator/Identifier for identifying unknown constant parameters in signal processes and/or dynamical systems, such as used in Adaptive Control Systems in systems engineering and in Time-Series Analysis and Prediction in econometrics, biomedical signal analysis, operations research, sonar/radar/optics data processing systems, and resource allocation, the ZEE (Zero Error Equilibrium) convergence quality improvement comprising replacement of negative feedback of the signal estimate error by a non-singular multiple of the ID estimate error, which is equivalent to minimizing the integral of the square of the instantaneous signal estimate error by means of negative feedback of its gradient with respect to the unknown parameters to affect the rate of change of the estimation/identification process, thereby rendering dithering or artificial maneuvering or stochastic excitation or broadband harmonic excitation of the input (hence also the "carrier" or regressor) unnecessary and eliminating the possibility of erratic or sluggish convergence or even catastrophic failure of convergence in favor of guaranteed uniform global exponential convergence of the ID errors to effective negligibility with respect to available measurement and computational capabilities.

6 Claims, 2 Drawing Sheets

ZEE PARAMETER ESTIMATOR/IDENTIFIER

BACKGROUND

1. Field of Invention

This invention relates to Recursive Parameter Estimators (System Identifiers), such as are used in the engineering fields of Adaptive Control Systems and Signal Processors and in the operations research, econometrics, biomedical signal processing, sonar/radar/optical data processing and resource allocation fields of Time Series Analysis and Prediction.

2. Description of Prior Art

A typical example of the use of a Parameter Estimator or System Identifier is depicted in FIG. 1. A signal process or dynamical system of an assumed known structure is given, but the set (or "vector") of parameters $\theta$ which specifically define the particular process or dynamical system at hand are assumed not to be known. The objective of a parameter estimator or identifier is to process the measurements to produce a reliable estimate $\hat{\theta}$ of the unknown parameters $\theta$ in a timely fashion. In the class of Least Square Estimators (LSE), which goes back to Gauss, the estimates $\hat{\theta}(t)$ are produced by an algorithm that is based on minimization of the sum of the squares of the estimate errors $\theta_i - \hat{\theta}_i$, $(i=1, 2, 3, \ldots, p)$.

The Parameter Estimator or Identifier is a special-purpose data-processing system or computer, such as a digital computer, analog computer, neural network, or the like. The Estimator/Identifier accepts as inputs two multichannel (multi-dimensional or "matrix-vector") signals: a main (vector) signal y which carries the desired information about $\theta$, and a secondary (matrix) carrier/regressor references signal (which may be implicit or omitted if its characteristics are known [e.g. a sine wave of known frequency and phase] and it is reconstructed or regenerated as part of the Estimation/Identification process). Under the legal Doctrine of Equivalents, a general purpose computer programmed to execute the algorithm which operates upon the signals obtained from a preprocessing filter which operates upon the input signals and output signals of the process or dynamical system to be identified and produces reliable parameter estimates $\hat{\theta}$, can also be regarded as such a special-purpose computer. Both the computer (an apparatus or system) and the procedure or method (a process) of programming and utilizing it constitute Statutory Patentable Subject Matter, as in, e.g. U.S. Pat. No. 4,646,256 (Feb. 24, 1987) on the DBT (Discrete Bracewell Transform).

The prior art in this field is described in such books on Adaptive Control System Design as those by Åström and Wittenmark [1], Middleton & Goodwin [2], Sastry & Bodson [3], and Slotine & Li [4].

It is not feasible to implement an industrially or commercially useful Parameter Estimator/Identifier except by means of a computing machine or physically implemented data-processing system, whether it be mechanical (pneumatic analog, hydraulic analog), optical (analog or digital), or electrical (analog) or electronic (digital) or hybrid. However, the architectural item which distinguishes one class of Estimator/Identifiers from another is the specific data processing Algorithm (or analog equivalent) which defines the information-processing architecture and the method of implementing and using the Estimator/Identifier.

As documented in the literature [1]-[4], Parameter Estimator/Identifiers are in widespread industrial and commercial use, and constitute Statutory Patentable Subject Matter. However, the disclosure of an invention in the category of a novel, useful and non-obvious Estimator/Identifier incorporating a novel, useful and non-obvious Algorithm does not preclude the bare Algorithm itself from being used in other non-industrial and non-commercial ways apart from the novel Estimator/Identifier (e.g. by hand-computation of an illustrative or academic numerical example).

Nevertheless, what chiefly distinguishes one Parameter Estimator/Identifier from another is the performance characteristics of the Estimation/Identification Algorithm which the Estimator/Identifier incorporates and is constructed or programmed to implement.

The principal performance characteristic is "convergence": does the set of parameter estimates $\hat{\theta}(t)$ eventually stop changing (or exhibit only tolerably small residual fluctuations) as time t increases, and do the estimate errors $(\theta - \hat{\theta})$ decrease to acceptability? A Parameter Estimator/Identifier which fails to converge has no utility.

The second performance characteristic is "quality of convergence"; there are many ways of defining quality of convergence but in the prior art the traditional criterion is based on the monotone non-increasing behavior of the estimate errors obtained by minimizing the integral (or sum) of the square of the estimate errors. This is called Least Squares Estimation (LSE). However, the present invention discloses a new quality of convergence category, Zero-Error Equilibrium (ZEE), which is superior to LSE as demonstrated herein.

The third and final performance characteristic is "speed of convergence". The more rapidly the Estimator/Identifier converges to the desired estimate, the more useful and more economical the Estimator/Identifier will be.

The prior art Estimator/Identifiers all suffer from two severe shortcomings with respect to the first and third performance characteristics. Specifically, for a reason to be clearly disclosed and explained herein, there is a large class of operating conditions and operating environments wherein the prior art Estimator/Identifiers fail to converge, resulting in a catastrophic failure of the System Identifier, which, if it is a subsystem of an Adaptive Control System, can result in a catastrophic failure of the entire system. For example, several early experimental Adaptive Flight Control Systems have suffered catastrophic failures, resulting in test-pilot fatalities.

Accordingly there has been a need for improved Estimators/Identifiers of guaranteed ID convergence characteristics (where the acronym ID is used as a common abbreviation for "identification").

In some classes of Parameter Estimator/Identifiers (e.g. those based upon Extended Kalman Filtering, denoted by EKF) there is a possibility of convergence to a parameter estimate which is quite different from the true value of the parameter. This is caused by the algorithm achieving a local but not a global minimum with respect to the criterion of Minimal Variance Estimation (MVE). However, in the presently disclosed art, hereafter called Zero-Error Equilibrium (ZEE), the structure of the algorithm and the class of potential applications is so chosen that this problem does not arise, i.e. the ZEE algorithm has only one equilibrium state and that corresponds to zero steady-state "ID estimate error". The convergence of the ZEE algorithm to any estimate automatically guarantees convergence to an acceptable estimate.

All prior known Parameter Estimators/Identifiers also suffer from susceptibility to very sluggish convergence; there are very common, specific conditions disclosed herein under which such Estimator/Identifiers converge so sluggishly as to vitiate any potential economic or practical utility.

Accordingly there has been a need for Estimator/Identifiers of prespecifiable guaranteed rates of convergence, particularly exponential convergence, if achievable.

In conclusion, there has been a need for Parameter Estimator/Identifiers of guaranteed convergence to zero error, at prespecifiable guaranteed rates.

OBJECTS AND ADVANTAGES

The object of this invention is an improved Parameter Estimator/Identifier (ZEE Estimator/Identifier) which does not suffer from the shortcomings of all previously known Estimator/Identifiers in that it might fail to converge or else converge so sluggishly or erratically as to be useless.

The first advantage of the present invention is to provide an improved Estimator/Identifier which is guaranteed in advance to converge always to zero ID error.

The second advantage of the present invention is to provide an improved Estimator/Identifier whose rate of ID convergence can be guaranteed in advance to be exponentially rapid in all applications.

The third advantage of the present invention is to provide an improved Estimator/Identifier whose rate of convergence can be prespecified in terms of the characteristics of the class of systems to be identified, which, if known, allow the Estimator/Identifier's gain to be so scaled as to ensure arbitrarily rapid exponential ID convergence.

Further objects and advantages will become apparent as the presently disclosed invention is described in greater detail.

DRAWING FIGURES

Figure 1:
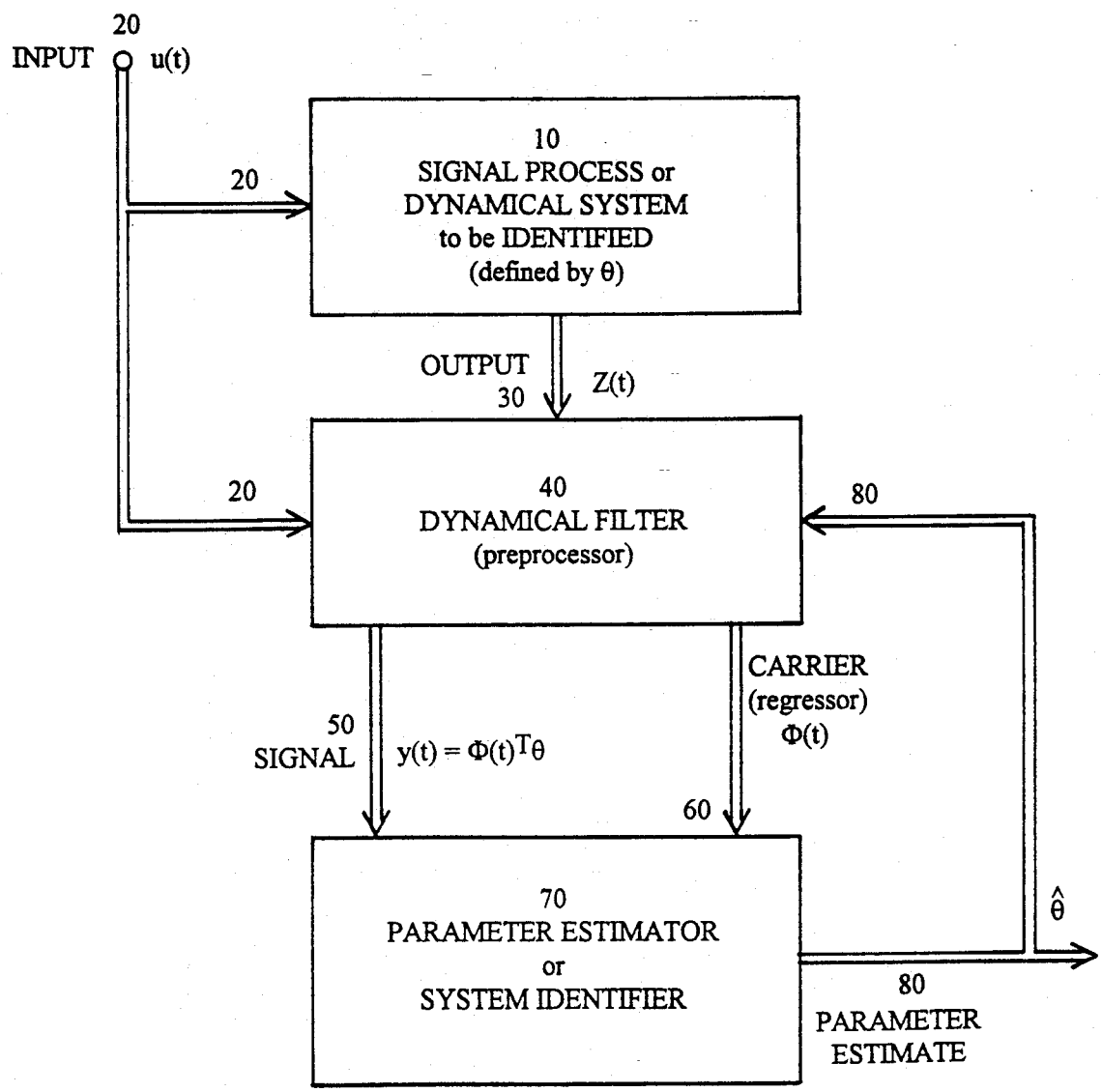
FIG. 1 shows a typical Parameter Estimator/Identifier as normally related to a signal process or dynamical system whose parameter identification is sought. This is a generic diagram, applicable both to the prior art an the presently improved Estimator/Identifier.

REFERENCE NUMERALS IN DRAWINGS 10 given signal process or dynamical system whose parameters are to be identified, i.e. whose defining parameters $\theta$ are to be estimated, where $\theta$ is a vector of dimension P, where p is defined as $p \equiv (n+m) \cdot (n+1)$, and where (l,m,n,p) are by definition non-negative integers
20 m-vector of inputs u(t)
30 l-vector of outputs z(t)
40 preprocessor or dynamical filter which accepts the given system's inputs 20 and outputs 30 and produces a time-varying carrier/regressor matrix $\Phi(t)$ of dimension $p \times (n+1)$ and a signal vector $y(t) = \Phi(t)^T \cdot \theta$ of dimension (n+1)
50 signal vector $y(t) = \Phi(t)^T \cdot \theta$ of dimension (n+1)
60 carrier matrix $\Phi(t)$ of dimension $p \times (n+1)$
70 system identifier (generic)
80 p-vector parameter estimate $\hat{\theta}$ output by system identifier
90 matrix-vector multiplier (multiplies $\Phi$ by y)
100 p-vector integrator
110 subtraction of one p-vector from another
120 multiplication of a p-vector by a scalar
130 another p-vector integrator
140 transposition of a $p \times (n+1)$ matrix
150 multiplication of two conformable matrices
160 $(p \times p)$-matrix integrator
170 matrix-vector multiplication
180 reciprocation of a matrix trace

DESCRIPTION

Figure 2:
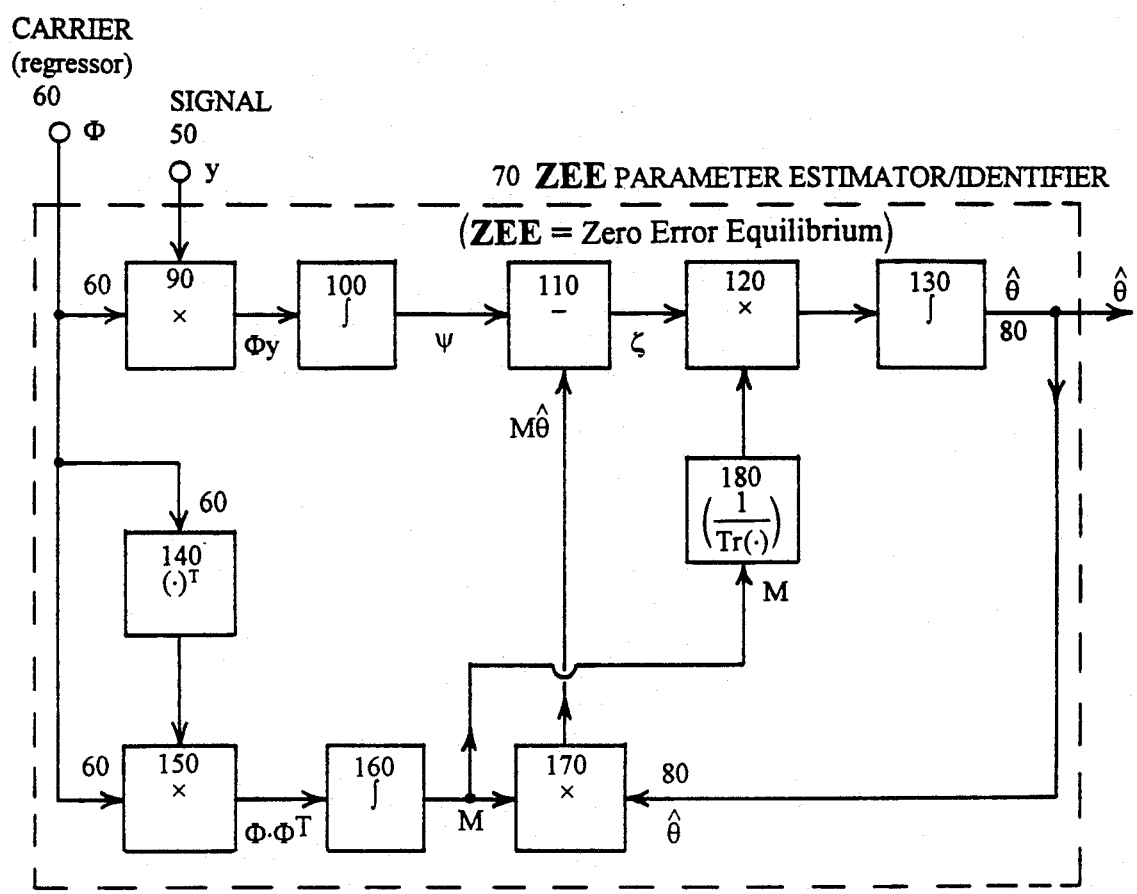
FIG. 2 is a detailed information-theoretic architectural diagram of one preferred embodiment of the presently disclosed improved Parameter Estimator/Identifier. The arrows depict the sequential order of the information flow.

FIGS. 1 to 2

FIG. 1 depicts a generic Parameter Estimator/Identifier as it is normally applied to identify unknown parameters for a signal process or unknown dynamical system (of known or postulated structure). The unknown system 10 may be regarded as a generic "black box", whose inputs 20 and outputs 30 may be measured and recorded, but whose interior dynamics is only known to be:

(a) linear, (b) autonomous [time-invariant], (c) defined uniquely by the parameters $\theta$.

Because the dimensions l and m of the output 30 and input 20 vectors are known, the only structural unknown is the dimension n of the signal process state or dynamical system's state. It is common to postulate n based upon a priori considerations, or to attempt to determine n empirically by adjusting the assumed value of n and considering the empirical adequacy of the subsequent total system performance.

The main ID information-bearing signal 50 (sometimes a filtered consequence of the output measurement 30) and carrier/regressor 60 needed by the Estimator/Identifier are normally produced by a preprocessor or dynamical filter 40 which accepts as its inputs not only the inputs 20 and outputs 30 of the given system whose parameter vector $\theta$ is unknown, but also the current estimate 80, $\hat{\theta}$, of those parameters produced by the Estimator/Identifier. Frequently the preprocessor 40 contains a dynamical model of the signal process or unknown system, and the parameter estimates are used to render this model operational. In sub-section 4 of the section on Theoretical Principles of Operation a typical method of design of the preprocessor is outlined; however, this is part of the prior art which is accepted without change, and regarding which no claims of novelty are made.

FIG. 2 depicts one presently preferred embodiment of the ZEE Parameter Estimator/Identifier information-theoretic architecture disclosed herein. The architecture is very similar to that of the prior art except for a subtle and extremely non-obvious but far-reaching change. In the prior art one processes as a single entity the signal error residual or (as called in the subject of stochastic optimal filtering as developed by Kailath) the innovations process vector $\eta = y - \hat{y} = y - \Phi^T \cdot \hat{\theta} = \Phi^T \cdot (\theta - \hat{\theta}) = \Phi^T \cdot \epsilon$, where $\Phi(t)$ is the known carrier or regressor signal and $\epsilon = \theta - \hat{\theta}$ is the identification error. One conventional approach, via the EKF, is to attempt to process y so as to "whiten" $\eta$, i.e. to extract all information from $\eta$. Another approach, the prior art LSE Estimator/Identifier, proceeds via integration of the following coupled system of ordinary differential equations:

$$d\hat{\theta}/dt = k_0 \cdot M^{-1} \cdot \Phi \cdot \eta,$$

$$\eta \equiv y - \Phi^T \cdot \hat{\theta},$$

$$dM/dt = \Phi \cdot \Phi^T.$$

Here $k_0 > 0$ is an arbitrary scaling factor, which may be constant or time-varying. Sometimes, in order to avoid the matrix inversion, the prior art LSE Estimator/Identifiers replace the inverse of M by $L \equiv M^{-1}$, and replace the preceding by:

$$d\hat{\theta}/dt = k_0 \cdot L \cdot \Phi \cdot \eta,$$

$$\eta \equiv y - \Phi^T \cdot \hat{\theta},$$

$$dL/dt = L \cdot (\Phi \cdot \Phi^T) \cdot L.$$

In contrast, the present invention takes the non-obvious step of "pulling the innovation $\eta$ apart" and uses instead the new ZEE innovations process $\xi$ defined as $\xi \equiv \psi - M \cdot \hat{\theta}$ in the following manner:

$$d\hat{\theta}/dt = k_o \cdot \xi, \; \xi \equiv \psi - M \cdot \hat{\theta},$$

$$d\psi/dt = \Phi \cdot y,$$

$$dM/dt = \Phi \cdot \Phi^T,$$

$$k_o \equiv g_o/\text{trace}[M], \; (g_o > 0).$$

Not only is the computationally expensive matrix inversion of LSE avoided, and the quadratic matrix equation of the preceding alternative LSE avoided, but, it will be shown herein, under the usually encountered conditions, that the preceding novel ZEE parameter-estimation procedure has a parameter estimation error $e = \theta - \hat{\theta}$ which not only always converges to zero but even always converges exponentially to zero! This enormous improvement in Estimator/Identifier capability and performance can best be understood by comparing the prior art innovation process n with the presently disclosed ZEE innovation process $\xi$:

$$n = y - \hat{y} = y - \Phi^T \cdot \hat{\theta} =$$

$$\Phi^T \cdot (\theta - \hat{\theta}) = \Phi^T \cdot e, \; (= \text{SINGULAR multiple of } e)$$

$$\xi = \psi - M \cdot \hat{\theta} = M \cdot \theta -$$

$$M \cdot \hat{\theta} = M \cdot e, \; (= \text{NON-SINGULAR multiple of } e)$$

in terms of which the prior art LSE Estimator/Identifier can be displayed in the form $$d\hat{\theta}/dt = k_0 \cdot M^{-1} \cdot \Phi \cdot \eta = k_0 \cdot M^{-1} \cdot \dot{M} \cdot e,$$

while the presently disclosed ZEE Estimator/Identifier has the form $$d\hat{\theta}/dt = k_0 \cdot \xi = k_0 \cdot M \cdot e.$$

The fatal flaw in the prior art LSE Estimator/Identifier can now be seen clearly, once it is noted that in it a factor of the dynamical coefficient matrix of $\epsilon$, namely $$\dot{M} \equiv dM/dt = \Phi \cdot \Phi^T,$$

is inherently singular and of rank at most $(n+1)$ and so has a null space of (extraordinarily large) dimension $$q = p - (n+l) = (n+l) \cdot (n+m-1).$$

In other words, in the LSE Estimator/Identifier whenever the parameter estimation error $\epsilon$ enters this null space [becomes orthogonal to the carrier or regressor $\Phi(t)$], the rate of change of the error vanishes! Consequently the prior art Estimator/Identifiers can stop operating while the parameter estimation error is arbitrarily large! This has led to the fallacious idea that it is necessary to "exercise the input or carrier/regressor $\Phi(t)$" continually and persistently ("with a sufficiently rich set of inputs") in order to identify the system parameters $\theta$; in fact, if the input is exercised at random, the error $\epsilon$ may indeed get fortuitously knocked out of the null space and the ID process may get restarted. However, neither "dithering" nor "jinking maneuvers" nor "stochastic excitation" nor "broadband harmonic excitation" is necessary with the present ZEE Estimator/Identifier, wherein the dynamical coefficient matrix $M(t)$ of the error $\epsilon$ is non-singular, so that the ID process cannot stop converging until the estimation error $\epsilon$ has been reduced to zero!

OPERATION

FIGS. 1 to 2

The manner of operation of the novel ZEE Parameter/Estimator/Identifier disclosed herein is exactly the same as that of the prior art Parameter Estimator/Identifiers, depicted in FIG. 1 (and explained in greater detail below).

The difference in operation, however, is vast. In order to see this, one needs to consider only one additional fact not used so far, namely that the unknown parameter vector $\theta$ is a constant:

$$\dot{\theta} \equiv d\theta/dt = 0, \; (\dot{\epsilon} = -\dot{\hat{\theta}}).$$

The prior art and presently disclosed Estimator/Identifiers can now be contrasted in terms of their ID error dynamics governing $\epsilon(t)$. The prior art LSE Estimator/Identifier operates as:

$$\dot{\epsilon} = -k_0 \cdot M^{-1} \cdot \dot{M} \cdot \epsilon,$$

which allows for the catastrophic possibility of a non-zero "equilibrium error" condition $$\dot{\epsilon}(t) \equiv 0, \; \epsilon(t) \neq 0,$$

and, since the norm of $M^{-1}(t)$ typically decreases with increasing time t, also allows for increasingly sluggish movement of $e(t)$ as t increases.

For example, consider the case $k_0 = 1$. Then $M \cdot \dot{\epsilon} = -\dot{M} \cdot \epsilon$, whence one finds that $d(M\epsilon)/dt \equiv M \cdot \dot{\epsilon} + \dot{M} \cdot \epsilon \equiv 0$, or $M(t) \cdot \epsilon(t) \equiv M(\tau) \cdot \epsilon(\tau)$, where $\tau > 0$ is the first time at which $M(t)$, originally zero, becomes positive definite. Hence $$\epsilon(t) = M^{-1}(t)\{M(\tau) \cdot \epsilon(\tau)\},$$

$$\dot{\epsilon}(t) = [M^{-1}(t)]\cdot\{M(\tau)\cdot\epsilon(\tau)\} = M^{-1}(t)\cdot\dot{M}(t)\cdot M^{-1}(t)\cdot\{M(\tau)\cdot\epsilon(\tau)\}.$$

If $\Phi(t) \to 0$, then $\dot{M} = \Phi\cdot\Phi^T \to 0$ and so $M(t)$ becomes constant, which causes $\epsilon(t)$ to take on a non-zero constant value, thus illustrating perfectly the possibility of catastrophic failure just discussed. But even if integration of $\Phi\cdot\Phi \equiv \dot{M}$ yields a matrix which is uniformly positive-definite for all t, and such that the smallest eigenvalue of $M(t)$ approaches infinity, and the norm of $M^{-1}(t)$ tends to vanish, the preceding relationship shows that when the norm of $\Phi(t)$ [hence also that of $\dot{M}$] remains bounded, then the norm of $\dot{\epsilon}$ tends to zero, i.e. the convergence becomes more and more sluggish!

On the other hand, the error $\epsilon(t)$ in the presently disclosed ZEE Estimator/Identifier operates as:

$$\dot{\epsilon} = -k_0\cdot M\cdot\epsilon,$$

which only has the one equilibrium value $\epsilon = 0$, and, as will be demonstrated in detail below, this implies that, for all $t > 0$, $$\|\epsilon(t)\| \leq \|\epsilon(0)\|\cdot exp(-\alpha\cdot t),$$

where the exponential rate of decay factor $\alpha > 0$ is a characteristic of the signal process or system to be identified and can be scaled to be arbitrarily fast by adjustment of the scaling factor $g_0$ in the numerator of $k_0$ above.

The preceding account of the structure and operation of the presently disclosed ZEE Parameter Estimator/Identifier 70 has been somewhat simplified in order to illustrate the basic principles of one presently preferred embodiment of the invention. There are several alternative preferred embodiments and several other obvious variations of the invention which should be considered, however, and in order to disclose these in a unified manner, preserving the unitary nature of the present invention, it is necessary to discuss the theoretical principles of this art in greater detail.

THEORETICAL PRINCIPLES OF OPERATION

1. Introductory Summary

This invention incorporates the disclosure of a family of new mathematical algorithms (data processing algorithms) that enable the identification (estimation) of unknown parameters from measurements of signals that depend on those parameters. The algorithms describe a specific sequence of mathematical operations that are performed on the measurement data to calculate (recursively) estimates of the unknown parameters.

The advantage of the new algorithms disclosed here derives from a unique, and heretofore unobtained, mathematical structure of the algorithms. In particular, the new algorithms do not become "paralyzed" (i.e. cease converging toward the correct parameter values, prematurely) when the parameter error vector becomes orthogonal to the vector of measurements. All other parameter estimation algorithms known to the present inventor suffer this latter shortcoming.

2. Overview of the Parameter Estimation Problem

In many problems of scientific interest, there arises the need to identify certain unknown (but constant) parameters $\{\theta_1, \theta_2, \ldots, \theta_n\}$ from measurements of an output signal $y(t)$ that is related to the unknown $\theta_i$ via an expression of the linear (or linearized) form $$y(t) = \phi_1(t)\theta_1 + \phi_2(t)\theta_2 + \ldots + \phi_n(t)\theta_n \tag{1a}$$

or, using vector notation, $$y(t) = \phi^T(t)\theta; \begin{cases} \phi^T = (\phi_1, \phi_2, \ldots, \phi_n) \\ \theta^T = (\theta_1, \theta_2, \ldots, \theta_n) \\ (\cdot)^T - \text{denotes "transpose"} \end{cases} \tag{1b}$$

where the $\phi_i(t)$ are completely known functions, and t denotes the "independent variable" such as time, spatial distance, etc. This is commonly referred to as the "parameter estimation" problem.

In (1), the independent variable t can be either continuous or discrete in nature; in the discrete case we will write $y(k), k = 0, 1, 2, \ldots$, etc. In some applications there are m separate measurement signals (outputs) $y_j(t)$, $j = 1, 2, \ldots, m$, of the form (1), where the sets $$\{\theta_i\}_1^{nj}, \{\phi_i\}_1^{nj}$$

associated with each signal $y_j(t)$ may be common or distinct. If the $\{\theta_i\}$ are common and the $\{\phi_i\}$ are distinct, we will write the counterpart of (1) in the vector-matrix format $$y(t) = [\Omega^T(t)]\theta; \begin{cases} y^T = (y_1, y_2, \ldots, y_m); \theta^T = (\theta_1, \theta_2, \ldots, \theta_n) \\ \Omega^T(t) = \begin{bmatrix} \phi^{T(1)} \\ \vdots \\ \phi^{T(m)} \end{bmatrix} \\ \phi^{T(j)} = (\phi_1^{(j)}, \phi_2^{(j)}, \ldots, \phi_n^{(j)}); j = 1, 2, \ldots, m. \end{cases} \tag{2}$$

If the sets $\{\theta_i\}$ are distinct for each $y_j(t)$, and the sets $\{\phi_i\}$ are common, we will then write the counterpart of (2) as $$y(t) = [\theta^T]\phi(t); \begin{cases} \phi^T = (\phi_1, \phi_2, \ldots, \phi_n) \\ \theta^T = \begin{bmatrix} \theta^{T(1)} \\ \vdots \\ \theta^{T(m)} \end{bmatrix} \\ \theta^{T(j)} = (\theta_1^{(j)}, \theta_2^{(j)}, \ldots, \theta_n^{(j)}); j = 1, 2, \ldots, m. \end{cases} \tag{3}$$

The three cases (1), (2), (3) constitute the three primary configurations for parameter estimation problems.

2.1 The Idea of a Parameter Estimation Algorithm

In the remaining part of this Overview Section we will, for simplicity, focus attention on the problem configuration (1) to illustrate the concepts of parameter estimation. All three problem configurations (1), (2), (3) will be considered in Section 3 where the new algorithms are disclosed.

The standard means by which the unknown parameters $$\{\theta_i\}_1^n$$

in (1) are identified consists of some form of mathematically-based algorithm for processing and manipulating the measurement data y(t) and known functions $$\{\phi_i(t)\}_1^n,$$

over an interval $t_o \leq t \leq T$, to produce (generate) a set of estimates $$\{\hat{\theta}_i(t)\}_1^n$$

where, hopefully, the value of each $\hat{\theta}_i(t)$ will quickly converge to a close approximation of the actual (true) parameter value $\theta_i$ as t increases. Over the years, several different algorithms have been devised for accomplishing parameter estimation. The customary way of analytically demonstrating the "goodness" of any particular algorithm is to derive the (a) mathematical description of how the instantaneous "estimation-errors"

$$e_i(t) \stackrel{\Delta}{=} \theta_i - \hat{\theta}_i(t), i = 1, 2, \ldots, n \quad (4)$$

behave as t increases. If one can mathematically prove that $\epsilon_i(t)$ quickly and steadfastly approaches zero as t increases, for any $\theta_i$ and any initial-conditions on $\epsilon_i(t)$, the associated algorithm is considered "good".

Historically, the mathematical algorithms that have been employed to accomplish parameter estimation for (1) have all been based on some form of (variant of) the so-called "Least-Squares Estimation Algorithm" which, in the continuous-t case, can be written as the (vector) first-order, ordinary differential equation [(·)- denotes d(·)/dt]

$$\dot{\hat{\theta}}(t) = k \left\{ \left[ C + \int_{t_o}^t \phi(\tau)\phi^T(\tau)d\tau \right]^{-1} \phi(t)[y(t) - \phi^T(t)\hat{\theta}(t)] \right\}; \quad (5)$$

$k$ = scalar > 0
$C = C^T > 0$.

As y(t) and $\phi(t)$ are fed into (input into) equation (5), the subsequent integration of $\dot{\hat{\theta}}(t)$ [defined by the right-side of (5)] produces the estimate $\hat{\theta}(t)$ that, hopefully, will converge to the true value $\theta$ as t increases.

The behavior of the parameter-estimation error vector $\epsilon(t) = \theta - \hat{\theta}(t)$, $\epsilon_i(t)$ given by (4), associated with the classical Least-Squares Estimation Algorithm (5) is found by computing $\dot{\epsilon} = d\epsilon(t)/dt$, using (5), to obtain the following (vector) first-order, linear, variable-coefficient differential equation that governs $\epsilon(t)$ $$\dot{\epsilon}(t) = -k \left\{ \left[ C + \int_{t_o}^t \phi(\tau)\phi^T(\tau)d\tau \right]^{-1} \phi(t)\phi^T(t) \right\} \epsilon(t) \quad (6)$$

2.2 Shortcomings of Conventional Algorithms

Under the assumption that $C = C^T > 0$, the symmetric matrix $$- \left[ C + \int_{t_o}^t \phi(\tau)\phi^T(\tau)d\tau \right]^{-1} \quad (7)$$

on the right-side of (6) is negative definite for all $t \geq t_o$—assuming $$\int_{t_o}^t \phi(\tau)\phi^T(\tau)d\tau$$

remains bounded. However, the $\epsilon(t)$ governed by (6) does not always steadfastly converge to $\epsilon = 0$ owing to the "rank-1" $n \times n$ matrix $[\phi(t)\phi^T(t)]$ on the right-side of (6). In particular, $\dot{\epsilon}(t)$ becomes zero, and thus $e(t)$ becomes prematurely "stuck" at some constant non-zero value, if $\epsilon(t)$ becomes orthogonal to $\phi(t)$. That is, if $\epsilon(t)$ moves into, and remains in, the (rather large) $(n-1)$-dimensional null-space of $[\phi(t)\phi^T(t)]$ over some interval $t_{s1} \leq t \leq t_{s2}$, thereby causing the condition $\phi^T(t)\epsilon(t) \equiv 0$, $t_{s1} \leq t \leq t_{s2}$, to occur in (6). This unwanted interruption in the convergence of $\hat{\theta}(t)$ toward $\theta$ tends to occur, for instance, when $\phi(t)$ becomes essentially constant $\neq 0$, or when $\| \phi(t) \| \approx 0$ (a condition described as "$\phi(t)$ is not persistently acting" in the literature on parameter estimation). This fundamental shortcoming of the classical Least-Squares Estimation Algorithm carries over to the several variants of that classical algorithm that have been proposed in the literature.

There is an additional intrinsic shortcoming of the Least-Squares Estimation Algorithm and its several variants. Namely, in (6) the "rate" $\dot{\epsilon}(t)$ at which $\hat{\theta}(t)$ approaches the true value $\theta$ is determined by the matrix-product norm $$\left\| \left[ C + \int_{t_o}^t \phi(\tau)\phi^T(\tau)d\tau \right]^{-1} \cdot [\phi(t)\phi^T(t)] \right\|. \quad (8)$$

Owing to the fact that the norm of $$\int_{t_o}^t \phi(\tau)\phi^T(\tau)d\tau$$

typically increases with increasing t, if $\phi(t)$ is "active" (i.e. is "persistently acting"), it follows that the matrix inverse indicated in the left-member of (8) will tend to cause the norm (8) to decrease with increasing t. This effect is commonly referred to as "the gain of the algorithm (5) decreases with increasing t." Thus, the Least-Squares Estimation Algorithm, and its variants, tend to exhibit increasingly sluggish convergence of $\hat{\theta}(t) \rightarrow \theta$, as t increases, thereby reducing their effectiveness in applications where the measurement data y(t) is monitored and processed over intervals $t_o \leq t \leq T$ that are not relatively short.

These two intrinsic shortcomings of Least-Squares Estimation Algorithms (and their variants) are associated with both continuous-t versions (such as (5)) and discrete-t versions, where y(t) is written y(k), k = 1,2, . . ., etc. For example, the conventional discrete-t version of (5) is given by the (vector) first-order difference equation $$\hat{\theta}(k) = \hat{\theta}(k-1) + \qquad (9)$$

$$\left[ C + \sum_{1}^{k} \phi(i)\phi^T(i) \right]^{-1} \phi(k)[y(k) - \phi^T(k)\hat{\theta}(k-1)],$$

$$k = 1, 2, \ldots, C = C^T > 0$$

and the estimation error (4) corresponding to (9) is governed by the (vector) first-order, linear, variable-coefficient difference equation [compare with (6)]

$$\epsilon(k) = \left\{ I - \left[ C + \sum_{1}^{k} \phi(i)\phi^T(i) \right]^{-1} \phi(k)\phi^T(k) \right\} \epsilon(k-1), \qquad (10)$$

$$k = 1, 2, \ldots,$$

It is clear from (9), (10) that $\epsilon(k)$ can become stuck at some non-zero constant value if $\epsilon(k-1)$ becomes orthogonal to $\phi(k)$ (i.e. $\phi^T(k)\epsilon(k-1) \equiv 0$). Moreover, the convergence of $\hat{\theta}(k)$ toward the true value $\theta$, in (9), typically becomes increasingly sluggish as k increases owing to the typically decreasing norm of the matrix-inverse on the right-side of (10). The indexing of k in (9), (10) is often written $k=0,1,2,\ldots$, which we will use consistently in the subsequent Sections of this disclosure.

2.3 Summary of Inherent Weaknesses in Conventional Parameter Estimation Algorithms In summary, the presence of the "rank-1" matrix term $\phi(t)\phi^T(t)$ and of the inverse-matrix term $$\left[ C + \int_{t_o}^{t} \phi(\tau)\phi^T(\tau)d\tau \right]^{-1}$$

on the right-side of (6) [and the analogous terms in the discrete-t counterpart (10)] imposes two fundamental, unavoidable weaknesses in the conventional Least-Squares Parameter Estimation Algorithm (5) [and (9)], and its variants. Namely, the presence of non-zero error equilibrium values and the increasingly sluggish convergence of error as t increases. The new parameter estimation algorithms disclosed in the next section overcome both of these inherent weaknesses.

3. Description of the New Parameter Estimation Algorithms

The new parameter estimation algorithms disclosed in this section consist of both continuous-t and discrete-t versions. Moreover those new algorithms are presented here for each of the three primary "problem configuration" cases represented by (1), (2), (3). For reasons that are explained below, we will refer to our new parameter estimation algorithms as Zero Error Equilibrium (ZEE) algorithms.

3.1 New ZEE Algorithms for the Problem Configuration (1)

For the class of parameter estimation problems represented by (1), the new ZEE estimation algorithms disclosed here take the following continuous-t and discrete-t forms.

3.1.1 Continuous-t Version of New ZEE Algorithm for (1)

The disclosed new continuous-t ZEE algorithm for (1) is $$\dot{\hat{\theta}}(t) = \qquad (11)$$

$$k_o(t) \left\{ \int_{t_o}^{t} \phi(\tau)y(\tau)d\tau - \left[ \int_{t_o}^{t} \phi(\tau)\phi^T(\tau)d\tau \right] \hat{\theta}(t) \right\};$$

$$k_o(t) = \text{scalar} > 0.$$

Note the absence of matrix-inverses in (11) and also the absence in (11) of the conventional grouping of terms $$\eta = [y(t) - \phi^T(t)\hat{\theta}(t)] \qquad (12)$$

as seen in (5). The conventional grouping of terms (12) is classically called the "innovations" term $\eta$ and its absence in our new algorithm (11), along with the absence of matrix-inverses in (11), accounts for the improved performance of (11)—as we shall now show. The scalar $k_o(t) > 0$ is somewhat arbitrary, in principle. A particularly effective choice of $k_o(t)$ is identified below, in eq. (20).

Error Dynamics

The estimation error-vector $\epsilon(t) = \theta - \hat{\theta}(t)$ associated with the new ZEE algorithm (11) is governed by the linear, variable-coefficient, differential equation $$\dot{\epsilon}(t) = -k_o(t) \left[ \int_{t_o}^{t} \phi(\tau)\phi^T(\tau)d\tau \right] \epsilon(t); \; k_o(t) > 0. \qquad (13)$$

Once again, notice the absence of a matrix-inverse term in (13), and also the absence in (13) of the "rank-1" $n \times n$ matrix $$[\phi(t)\phi^T(t)] \qquad (14)$$

as seen in the conventional result (6) associated with (5). The mathematical structure of the right-side of (13) results in the following universal property of $\epsilon(t)$.

Theorem 1

Suppose the $n \times n$, symmetric, non-negative definite matrix $$M(t) = \int_{t_o}^{t} \phi(\tau)\phi^T(\tau)d\tau \qquad (15)$$

attains $$\text{rank } M(t_1) = n \qquad (16\text{-a})$$

at some $t_1 > t_o$ and suppose $k_o(t)$, $M(t)$ are such that $$k_o(t)\epsilon^T M(t)\epsilon \geq \alpha \epsilon^T \epsilon, \; v \; t \geq t_1, \qquad (16\text{-b})$$

for some constant scalar $\alpha > 0$. Then, for all $t \geq t_1$ the squared-norm $$\| \epsilon(t) \|^2 = \epsilon^T(t)\epsilon(t) \qquad (17)$$

of $\epsilon(t)$ in (13) monotonically decreases, with increasing t, according to the relationship $$\frac{d(\|\epsilon(t)\|^2)}{dt} = -2k_o(t)e^T(t)M(t)e(t) \leq -2\alpha \|\epsilon(t)\|^2, \quad (18)$$

which is clearly negative definite for all $t \geq t_1$.

Remark—The condition (16-a) is a relatively mild assumption since it "almost always" occurs in practical applications and it is typically invoked in all forms of parameter estimation algorithms. In fact, failure to satisfy (16-a) would imply that the n-vector $\phi(t)$ is always confined-to (i.e. is "invariant" with respect to) some linear sub-space $ having dimension p<n. This behavior of $\phi(t)$ means $$\phi^T(t)[S] \equiv 0 \ t \geq t_o, \quad (19)$$

where [S] is some non-zero, constant n×p matrix having rank p=dim. $. Condition (16-b) implies the minimum eigenvalue of $k_o(t)M(t)$, $t \geq t_1$, is bounded from below by some constant $\alpha > 0$. Thus, to avoid unbounded $k_o(t)$ in (16-b), the minimum eigenvalue of M(t) itself must be bounded from below by some positive constant.

Remark—The norm of M(t) in (15)–(18) typically increases with increasing t (it cannot decrease) and thus the speed $\dot{\epsilon}(t)$ at which $\hat{\theta}(t) \to \theta$ will tend to increase with increasing t—provided one picks $k_o(t) > 0$ to be non-decreasing. This "quickening response" feature of our new ZEE algorithm (11) is in sharp contrast with conventional Least-Squares Algorithms (and their variants) where, as we have already mentioned in Section 2.2, the motion of $\hat{\theta}(t)$ toward $\theta$ becomes increasingly more sluggish as t increases owing to the inverse of [C+M(t)] appearing in (5), (6).

Remark—Under the assumptions (16), the null-space of the matrix $k_o(t)M(t)$ consists only of the point (0,0, . . . ,0). Therefore the differential equation (13) has only the one equilibrium point $\epsilon = 0$ and consequently $\epsilon(t)$ in (13) can never become "stuck" at some non-zero value due to a premature vanishing of $\dot{\epsilon}(t)$. This unique feature, which is the motivation for referring to our new algorithms as Zero Error Equilibrium (ZEE) algorithms, is in sharp contrast to the Least-Squares Algorithm (5), and other prior art, where the rank-1 matrix $\phi(t)\phi^T(t)$ in (6) always leads to an (n−1) dimension manifold of non-zero $\epsilon$ equilibrium values which looms as an (n−1)-dim. "opportunity" for $\dot{\epsilon}(t)$ to vanish prematurely, as we previously explained in Section 2.2.

Choice of the Scalar Gain $k_o(t)$ in (11)

In principle, the positive scalar gain $k_o(t)$ in (11) is only required to satisfy (16-b) in order to have (18) remain negative definite for all $t \geq t_1$. However, owing to the possible increasingly "quickened response" of $\epsilon(t) \to 0$ in (18), as t increases, it is prudent to additionally choose $k_o(t)$ in such a way that the otherwise desirable "quickening" does not become so excessively intense that the computing hardware which is integrating the algorithm (11) begins to introduce "computing errors" due to excessively rapid changes in $\hat{\theta}(t)$ from one step to the next. This concern is especially warranted when (11) is "integrated" in some numerical-integration fashion using digital hardware; however, even using "analog" electronic integrating circuits, or other analog implementations, there is a potential for computing errors if the norm of M(t) becomes excessively large. To mitigate this potential problem, we propose to choose $k_o(t)$ to counteract (cancel-out) the excessive growth of $\|M(t)\|$ by writing $$k_o(t) = \frac{g_o}{\int_{t_o}^{t} \phi^T(\tau)\phi(\tau)d\tau} \quad (20)$$

where $g_o$ is a scalar positive parameter. Note that $$\int_{t_o}^{t} \phi^T(\tau)\phi(\tau)d\tau = \text{Trace}[M(t)] = \sum_{1}^{n} \lambda_i(M(t)), \quad (21)$$

, $\lambda_i(M(t))$ = eigenvalue of $M(t)$ so that the use in (11) of $k_o(t)$ defined in (20) divides M(t) by its own "trace" thereby assuring that at each $t \geq t_1$ the "instantaneous eigenvalues" $\bar{\lambda}_i(t)$ of the normalized matrix $$\left[ \frac{M(t)}{\text{Trace }[M(t)]} \right], \quad (22)$$

satisfy $$0 < \bar{\lambda}_i(t) \leq 1, \ t \geq t_1 \quad (23)$$

The choice (20) for $k_o(t)$ must also satisfy (16-b). In light of the comments below (19) this means $$\lambda_{min.}\left( \frac{g_o M(t)}{\text{Trace } M(t)} \right) \geq \alpha, \ t \geq t_1, \quad (23\text{-}1)$$

for some fixed $\alpha > 0$. Note that the parameter $g_o > 0$ simply acts as a time-scale factor. Since $$\lambda_{min.}\left( \frac{M(t)}{\text{Trace } M(t)} \right) \geq \left( \frac{\lambda_{min}(M(t))}{n\lambda_{max}(M(t))} \right) \quad (23\text{-}2)$$

it follows that condition (16-b) is satisfied if $$\frac{\lambda_{max}(M(t))}{\lambda_{min}(M(t))} \leq \left( \frac{g_o}{n\alpha} \right), \text{ some fixed } \alpha > 0, \quad (23\text{-}3)$$

which is recognized as a finite upper bound on the "condition-number" of M(t), $t \geq t_1$. In summary, the choice (20) for $k_o(t)$ satisfies (16-b) and (23), with $0 < \alpha \leq \bar{\lambda}(t) \leq 1$, provided that the maximum and minimum eigenvalues of M(t) satisfy (23-3) for $t \geq t_1$. The design parameter $g_o > 0$ in (20) can now be adjusted to "scale" the $\bar{\lambda}_i(t)$ in (23) upward [or downward] at the discretion of the user. In this way, the desirable quickening response of (11) can be "managed," as t increases, to avoid excessive quickening.

3.1.2 Discrete-t Version of New ZEE Algorithm for (1)

The discrete-t version of the new ZEE parameter estimation algorithm (11) is [here we index k=0,1,2, .. .]

$$\hat{\theta}(k+1) = \hat{\theta}(k) + \quad (24)$$

$$\left(\frac{\bar{g}_o}{\sum\limits_o^k \phi^T(i)\phi(i)}\right)\left[\sum\limits_o^k \phi(i)y(i) - \left[\sum\limits_o^k \phi(i)\phi^T(i)\right]\hat{\theta}(k)\right], \bar{g}_o > 0.$$

which can be used, for instance, when the problem configuration (1) involves "discrete-t data" $y(k)$, $\phi(k)$, $k=0,1,2,\ldots$. Note that the scalar gain $k_o(t)$ in (11) has been represented in (24) as the discrete-t version of the option (20). This latter option is not the only one that could be used for $k_o(t)$ in (24) but it is an especially attractive option in the discrete-t case, as we shall show. Error Dynamics—The behavior of the estimation error $\epsilon(k)=\theta-\hat{\theta}(k)$ associated with (24) is found by computing $\epsilon(k+1)$, using (24), to determine that $\epsilon(k)$ is governed by the linear, variable-coefficient, difference-equation $$e(k+1) = \left\{I - \left(\frac{\bar{g}_o\left[\sum\limits_o^k \phi(i)\phi^T(i)\right]}{\sum\limits_o^k \phi^T(i)\phi(i)}\right)\right\}e(k). \quad (25)$$

The discrete-t scalar parameter $\bar{g}_o$ in (24), (25) should be chosen by the user to assure that $\epsilon(k)$, $k=0,1,2,\ldots$ steadfastly approaches zero as k increases. To see how this can be done, we proceed as in Thm. 1 and compute the discrete-t "difference $\Delta(\cdot)$" of the squared-norm $\|\epsilon(k)\|^2 = \epsilon^T(k)\epsilon(k)$. The result is $$\Delta\|e(k)\|^2 = e^T(k+1)e(k+1) - e^T(k)e(k)$$
$$= -2e^T(k)Q(k)e(k) + e^T(k)Q^2(k)e(k) \quad (26a)$$

where $$Q(k) = \frac{\bar{g}_o\left[\sum\limits_o^k \phi(i)\phi^T(i)\right]}{\sum\limits_o^k \phi^T(i)\phi(i)} = Q^T(k) \geq 0. \quad (26b)$$

Clearly, $\|\epsilon(k)\|^2 \to 0$ steadfastly, as k increases, if $$\Delta\|\epsilon(k)\|^2 \leq -\alpha\|\epsilon(k)\|^2, \quad (27)$$

for some fixed scalar $\alpha>0$. To establish (27) we first invoke the discrete-t counterpart of (16-a) by defining $$M(k) = \sum\limits_o^k \phi(i)\phi^T(i) = M^T(k) \geq 0, \quad (28)$$

and invoking the assumption that there exists a $k_1$ such that $$\text{rank}[M(k)] \equiv n, \text{ for all } k \geq k_1 > 0, . \quad (29)$$

Recall that rank[M(k)] is a non-decreasing function of k. In view of (28) we have $$\text{Trace}[M(k)] = \sum\limits_o^k \phi^T(i)\phi(i) = \sum\limits_1^n \lambda_j(M(k)) \quad (30)$$

and therefore the eigenvalues $\lambda_j(k)$ of the normalized matrix $$\left[\frac{M(k)}{\text{Trace}M(k)}\right], \quad (31)$$

satisfy [defining $\text{cond}(M) \equiv \lambda_{max}(M)/\lambda_{min}(M)$ for any $M=M^T>0$]

$$0 < 1/\{n\cdot\text{cond}(M(k))\} \leq \bar{\lambda}_j(k) \leq 1, \text{ for all } k \geq k_1; j=1,\ldots,n. \quad (32)$$

Consequently, the eigenvalues $\tilde{\lambda}_j(k)$ of $Q(k)$ in (26) satisfy $$k \geq k_1 \quad (33)$$
$$0 < \bar{g}_o/\{n\cdot\text{cond}(M(k))\} \leq \tilde{\lambda}_j(k) \leq \bar{g}_o, \bar{g}_o > 0; \quad j=1,2,\ldots,n$$

and the eigenvalues $\tilde{\tilde{\lambda}}_j(k)$ of $Q^2(k)$ in (26) satisfy $$0 < \tilde{\tilde{\lambda}}_j(k) \leq (\bar{g}_o)^2, k \geq k_1 \quad (34)$$

More precisely, by basic properties of eigenvalues, $$\tilde{\tilde{\lambda}}_j(k) = \tilde{\lambda}_j^2(k), j=1,2,\ldots,n; k \geq k_1 \quad (35)$$

Since $Q(k)$ and $Q^2(k)$ in (26) can both be diagonalized by the same orthogonal matrix $T(k)$, it follows from (35) that (26a) satisfies (27) if, and only if, $$-2\tilde{\lambda}_j(k) + \tilde{\lambda}_j^2(k) \leq -\alpha, \quad k \geq k_1 \quad (36)$$
$$j = 1,2,\ldots,n$$

for some fixed $\alpha > 0$. Since $\tilde{\lambda}_j(k)>0$, expression (36) is satisfied if the eigenvalues of $Q(k)$ satisfy $$0 < \bar{a} \leq \tilde{\lambda}_j(Q(k)) \leq (2-\bar{a}), \quad k \geq k_1 \quad (37)$$
$$j = 1,2,\ldots,n$$

for some fixed $\bar{a}>0$. In the light of (33), the result (37) is satisfied if $$0 < \bar{a} \leq 1/\{n.\text{cond}(M(k))\} \ (\leq 1), \quad (38a)$$

and the parameter $\bar{g}_o$ in (24), (25) is chosen within the range $$1 \leq \bar{g}_o \leq (2-\bar{a}) < 2 \quad (38b)$$

to assure that $$\Delta\|\epsilon(k)\|^2 \leq -\alpha\cdot\|\epsilon(k)\|^2, \alpha=\bar{a}\cdot(2-\bar{a})>0, \text{ for all } k \geq k_1 \quad (39)$$

as indicated in (27). For maximum effectiveness in achieving $\epsilon(k) \to 0$ promptly, $\bar{g}_o$ in (25), (38) should be selected to minimize the value of $\Delta\|\epsilon(k)\|^2<0$ in (26a). If $\bar{g}_o$ can be re-adjusted at each k, one can, for instance, choose $\bar{g}_o$ to minimize $\Delta\|\epsilon(k)\|^2$ over the unit ball in $\epsilon$-space—subject to (38). Note that $\epsilon(k)$ is not known in practice.

3.2 New ZEE Algorithms for the Problem Configuration (2)

For the class of parameter estimation problems represented by (2), the new continuous-t and discrete-t ZEE estimation algorithms disclosed here are as follows.

3.2.1 Continuous-t Version of New ZEE Algorithm for (2)

$$\dot{\hat{\theta}}(t) = k_o(t) \left\{ \int_{t_o}^{t} \Omega(\tau) y(\tau) d\tau - \left[ \int_{t_o}^{t} \Omega(\tau) \Omega^T(\tau) d\tau \right] \hat{\theta}(t) \right\}, \quad (40)$$
$$k_o(t) > 0.$$

Note that (40) is a natural generalization of (11).

Error Dynamics

The estimation error $\epsilon(t) = \theta - \hat{\theta}(t)$ associated with (40) is governed by the linear, variable-coefficient differential equation $$\dot{\epsilon}(t) = -k_o(t) \left[ \int_{t_o}^{t} \Omega(\tau) \Omega^T(\tau) d\tau \right] \epsilon(t) \quad (41)$$

which is the natural generalization of (13). Under the assumptions that $$\text{rank}[M(t_1)] = \quad (42 - a)$$

$$n, \text{ for some } t_1 > t_o, \text{ where } M(t) = \left[ \int_{t_o}^{t} \Omega(\tau) \Omega^T(\tau) d\tau \right]$$

and $$\lambda_{min}(M(t)) \geq \beta > 0, \text{ for some } \beta = \text{constant}, \ t \geq t_1, \quad (42\text{-b})$$

the convergence of $\epsilon(t) \to 0$ for (41) can be established just as in (17), (18).

Choice of $k_o(t)$ in (40)

The remarks above (20) apply also to (40), (41) and for that reason it is effective to choose k(t) in (40) as $$k_o(t) = \left( \frac{g_o}{\int_{t_o}^{t} \text{Trace}[\Omega(\tau)\Omega^T(\tau) d\tau]} \right); \ g_o > 0 \quad (43)$$

which is the natural generalization of (20). Under the choice (43), satisfaction of (42-b) leads to a uniformly bounded "condition number" requirement, analogous to (23-3), for the matrix M(t), $t \geq t_1$. The remarks below (23-3) apply also to the choice of $g_o$ in (43).

3.2.2 Discrete-t Version of New ZEE Algorithm for (2)

The discrete-t version of the new ZEE parameter estimation algorithm (40) is $$\hat{\theta}(k+1) = \hat{\theta}(k) + \quad (44)$$

-continued $$\left( \frac{\bar{g}_o}{\text{Trace}\left( \sum_{o}^{k} \Omega(i)\Omega^T(i) \right)} \right) \left[ \sum_{o}^{k} \Omega(i) y(i) - \left[ \sum_{o}^{k} \Omega(i) Q^T(i) \right] \hat{\theta}(k) \right]$$
$$\bar{g}_o > 0$$

which is recognized as the natural generalization of (24).

Error Dynamics

The parameter estimation error $\epsilon(k) = \theta - \hat{\theta}(k)$ associated with (44) is governed by the linear, variable-coefficient difference equation $$\epsilon(k+1) = \left\{ I - \left( \frac{\bar{g}_o \left[ \sum_{o}^{k} \Omega(i)\Omega^T(i) \right]}{\text{Trace}\left[ \sum_{o}^{k} \Omega(i)\Omega^T(i) \right]} \right) \right\} \epsilon(k). \quad (45)$$

The analysis and remarks concerning (26)-(39) apply also to the allowable choices of $(\bar{g}_o)$ in (45). Under such choices for $\bar{g}_o$, the steadfast convergence of $\epsilon(k) \to 0$, as k increases $(k > k_1)$ is assured in (45) provided $$\text{rank}\left[ \sum_{o}^{k_1} \Omega(i)\Omega^T(i) \right] = n, \text{ for some } k_1 \geq 0, \quad (46)$$

which is the natural discrete-t counterpart of (42).

3.3 New ZEE Algorithms for the Problem Configuration (3)

For the class of parameter estimation problems represented by (3), the new continuous-t and discrete-t ZEE estimation algorithms disclosed here are as follows.

3.3.1 Continuous-t Version of New ZEE Algorithm for (3)

In the problem configuration (3), the unknown (constant) parameters consist of the nm elements of the m×n matrix $\Theta^T$ defined in (3). The new continuous-t ZEE algorithm for generating estimates $\hat{\Theta}(t)$ of $\Theta$ is $$\dot{\hat{\Theta}}(t) = K_o(t) \left[ \int_{t_o}^{t} \phi(\tau) y^T(\tau) d\tau - \left[ \int_{t_o}^{t} \phi(\tau)\phi^T(\tau) d\tau \right] \hat{\Theta}(t) \right], \quad (47)$$

where $K_o(t)$ is a somewhat arbitrary matrix. Some specific choices for $K_o(t)$ are described below.

Error Dynamics

The estimation-error associated with the problem configuration (3) consists of the matrix of error quantities E(t) defined as $$E(t) = \Theta - \hat{\Theta}(t); \ \Theta[\theta^{(1)}|\theta^{(2)}| \ldots | \theta^{(m)}]. \quad (48)$$

Using (47) it is found that the matrix E(t) obeys the first-order linear, variable-coefficient, matric differential equation $$\dot{E}(t) = -K_o(t)\left[\int_{t_o}^{t} \phi(\tau)\phi^T(\tau)d\tau\right]E(t) \quad (49)$$

Thus, invoking the standard assumption (15), (16) it follows that one can choose a non-singular matrix $K_o(t)$ in (49) that assures the parameter convergence $$E(t) \to 0, \text{ for all } t \geq t_1, \quad (50)$$

for all initial-conditions $E(t_o)$ in (49)

Choice of $K_o(t)$ in (47),(49)

To see the effect of $K_o(t)$ on the solutions $E(t)$ of (49) we will write E in the "column-format", $$E(t) = [\epsilon^{(1)}(t) | \epsilon^{(2)}(t) | \ldots | \epsilon^{(m)}(t)] \quad (51)$$

where $$\epsilon^{(j)}(t) = \theta^{(j)} - \hat{\theta}^{(j)}(t), \, j=1,2,\ldots,m. \quad (52)$$

Substituting (51) into (49), and using the definition (15) for M(t), we can write (49) in the column decomposition (set of vector differential equations)

$$\dot{\epsilon}^{(j)}(t) = -K_o(t)M(t)\epsilon^{(j)}(t), \, j=1,2,\ldots,m. \quad (53)$$

In view of (53) and (13) it follows that one natural choice for $K_o(t)$ is $$K_o(t) = k_o(t)I; \, k_o = \text{scalar} > 0, \quad (54)$$

where $k_o(t)$ is chosen precisely as in (20).

Another possible choice for $K_o(t)$ in (47) is $$K_o(t) = G_o M^{-1}(t) \quad (55)$$

where $G_o$ is any constant matrix such that $$\dot{\epsilon}^{(j)}(t) = -G_o \epsilon^{(j)}(t) \quad (56)$$

is an asymptotically stable system, (i.e. all eigenvalues $\lambda_i$ of $G_o$ have strictly positive real-parts). The use of (55) is restricted to $t \geq t_1$, where $t_1$ is the smallest $t_i$ at which rank $M(t_i) = n$; see (15), (16).

3.3.2 Discrete-t Version of New ZEE Algorithm for (3)

The discrete-t version of the new ZEE parameter-matrix estimation algorithm (47) is $$\hat{\Theta}(k+1) = \hat{\Theta}(k) + K_o(k)\left[\sum_{o}^{k} \phi(i)y^T(i) - \left[\sum_{o}^{k} \phi(i)\phi^T(i)\right]\hat{\Theta}(k)\right], \quad (57)$$

where $$K_o(k) = \frac{\bar{g}_o I}{\sum_{o}^{k} \phi^T(i)\phi(i)}; \, \bar{g}_o > 0. \quad (58)$$

Note that (58) is a matrix counterpart of the corresponding scalar term used in (24). The $(\bar{g}_o)$ in (58) is a scalar.

Error Dynamics

Using the matrix-error definition (48), it is found from (57) that E(k), k=0,1,2, . . . , is governed by the first-order linear, variable-coefficient, matric difference equation $$E(k+1) = \left\{I - \left(\frac{\bar{g}_o\left[\sum_{o}^{k} \phi(i)\phi^T(i)\right]}{\sum_{o}^{k} \phi^T(i)\phi(i)}\right)\right\}E(k). \quad (59)$$

The effect of $(\bar{g}_o)$ on the convergence of $E(k) \to 0$ in (59) can be seen by invoking the column decomposition of E(k) as in (51), (52) and noting that the columns of (59) then become $$\epsilon^{(j)}(k+1) = \left\{I - \left(\frac{\bar{g}_o\left[\sum_{o}^{k} \phi(i)\phi^T(i)\right]}{\sum_{o}^{k} \phi^T(i)\phi(i)}\right)\right\}\epsilon^{(j)}(k), \quad (60)$$

$$j = 1,2,\ldots,m.$$

Since (60) is precisely the same form as (25), one can now apply all the analysis and remarks associated with (26)-(39) to guide the choice of $(\bar{g}_o)$ in (57), (58).

3.4 Summary of New ZEE Parameter Estimation Algorithms Disclosed in This Section In this Section 3 of our Theoretical Principles of Operation, we disclose new Zero Error Equilibrium (ZEE) parameter estimation algorithms for each of the three primary estimation problems defined by the data configurations (1), (2), (3). Moreover, for each of those three cases we disclose both continuous-t and discrete-t versions of the respective ZEE algorithms. Our disclosures in this Section are summarized as follows.

Case (1)

For case (1), the continuous-t version of the new ZEE algorithm is given by (11), (20), (23-3) and the discrete-t version is given by (24), (38).

Case (2)

For case (2), the continuous-t version of the new ZEE algorithm is given by (40),(43), and the discrete-t version is given by (44), with $(\bar{g}_o)$ chosen as in (24).

Case (3)

For the case (3) problem configuration, the continuous-t version of the new ZEE algorithm is given by (47), with (54), (55) representing two possible choices of $K_o(t)$ and with the "stabilization" of $\epsilon^{(j)}(t) \to 0$ in (53) being the underlying requirement for all candidate choices of $K_o(t)$. The discrete-t version of (47) is given by (57),(58) with $(\bar{g}_o)$ chosen as in (38).

Claimed Advantages of the New ZEE Algorithms

In each of the three cases (1), (2), (3) the new ZEE algorithms (both continuous-t and discrete-t versions) have the unique and heretofore unobtained structure whereby the error-dynamics (13),(25); (41),(45); (49),(59), of the ZEE algorithm's parameter estimation error, cannot prematurely "stop converging" prior-to error becoming zero. In other words, the only possible steady-state equilibrium solution to those error-dynamics equations is the "zero-error" solution. This feature is in sharp contrast to conventional "least-squares parameter estimation algorithms" (and their several variants) in which the associated error-dynamics, typified by (6),(10), always have a manifold of non-zero equilibrium points which permit the error to become a non-zero steady-state value whenever the error becomes orthogonal to the known signals $\phi(t)$ [or $\phi(k)$]; i.e. whenever the condition $$\phi^T\epsilon=0, \text{ (including the case } \phi=0), \quad (61)$$

occurs in (6),(10). This universal shortcoming in all prior art parameter estimation algorithms is the reason why expositions of the prior art typically include the assumptions/requirements that the vector $\phi(t)$[or $\phi(k)$] be non-zero and "persistently acting" (so that the likelihood of (61) occurring is reduced). In our new ZEE algorithms disclosed in this section, the "persistently acting" assumption on $\phi(t)$[$\phi(k)$] is completely unnecessary since no term of the form $\phi^T\epsilon$ appears in any of the first-order error-dynamic equations (13),(25); (41),(45); (49),(59). This has been achieved by the unique structure of the new ZEE algorithms themselves whereby the $\phi^T(\cdot)$ term is incorporated inside the integral [inside the summation operation, for discrete-t] and the current estimate $\hat{\theta}(\cdot)$ is placed outside the integral [outside the summation operation]. This subtle structural change is seen by comparing the conventional least-squares parameter estimation algorithms (5), (9) to our disclosed new ZEE algorithms (11), (24). The resulting impact on the error dynamics is seen by comparing (6) to (13) and comparing (10) to (25).

It is remarked that the conventional assumption about $\phi(t)$[$\phi(k)$] being "persistently acting" [sometimes called "persistent excitation" when $\phi(\cdot)$ relates to certain controlled inputs to the signal composition y(t)] has been addressed in numerous textbooks and scientific papers where the consensus seems to be that unless $\phi(\cdot)$ remains sufficiently "active" (i.e. $\phi(t)$ is non-zero and continually changing with t) during the parameter estimation process, the parameter estimates $\hat{\theta}_i(t)$ might not converge to their correct values $\theta_i$. Our new ZEE algorithms show that this conventional wisdom is FALSE. In particular, in our new ZEE algorithms $\phi(t)$ is only required to be such that (15),(16) [or their counterparts] are satisfied for some $t_1$. Thereafter, $\phi(t)$ can become identically zero and our new ZEE algorithms will, theoretically, continue to converge to the correct parameter values; see, for instance, how (13) behaves in such a case.

3.5 Comparative Derivation of LSE and ZEE Algorithms

In the field of analog computing there is a well-known technique for converting the solution of an algebraic system of equations into the integration of a system of ordinary differential equations. We shall first formalize this technique in the form of a theorem, and then invoke the theorem in comparative derivations of the LSE and ZEE Algorithms.

Theorem 2 Let a symmetric, non-negative definite $n \times n$ matrix $A(t) \equiv A(t)^T \geq 0$ and a continuous n-vector function f(t) be given, such that there is a constant n-vector $x_0$ with the property that $$A(t)x_0 = f(t) \quad ( \nu \; t \geq 0).$$

Then $x_0$ can be found as the steady-state solution of the differential equation

[where, for fixed $a_1 > 0$, $a_1 \cdot I_n \leq R$, $a_2 \cdot I_n \leq R^{-1}$]
$R(t)\dot{x} = -A(t)x + f(t)$, $(R = R^T > 0)$,
provided that, for almost all times,
$\text{rank}[A(t)](=)n$.

Proof. Define the error vector $\epsilon \equiv x_0 - x$. Then compute that $$\dot{\epsilon} = -\dot{x} = R(t)^{-1}A(t)[x_0-\epsilon] - R(t)^{-1}f(t) = -R(t)^{-1}A(t)\epsilon.$$

Now assume that for some t, $\epsilon(t) \neq 0$ and yet $A(t)\epsilon = 0$, and note that this implies also, for the same t, that $\dot{\epsilon} = 0$. Then compute that, with the exception of times t having measure zero, $$(A\epsilon)^{\cdot} = \dot{A}\epsilon + A\dot{\epsilon} = \dot{A}\epsilon \neq 0,$$

because the contrary would contradict the hypothesis that $\dot{A}$ has full rank. Consequently it is impossible for $A(t)\epsilon \equiv 0$ on any open t-interval, and therefore $\epsilon(t) \to 0$ as $t \to +\infty$. □

By application of the preceding well-known technique we can render transparent the difference between LSE and ZEE parameter estimation.

|  | LSE |  | ZEE |
|---|---|---|---|
| given: | $y = \phi^T\theta$ |  | $y = \phi^T\theta$ |
| premult. by $\phi$: | $\phi y = \phi\phi^T\theta$ |  |  |
|  |  | integrate: | $\int \phi y d\tau = [\int \phi\phi^T d\tau]\theta$ |
| associate: |  | assoc.: |  |
|  | $\hat{\theta} = x$ |  | $\hat{\theta} = x$ |
|  | $f = \phi y$ |  | $f = \int \phi y d\tau$ |
|  | $A = \phi\phi^T$ |  | $A = \int \phi\phi^T d\tau = M$ |
|  | $R = \int A d\tau = M$ |  | $R = I_n$ |
| Thm. 2 |  | Thm. 2 |  |
|  | $-\dot{\epsilon} = \dot{\hat{\theta}} = M^{-1}\{\phi y - \phi\phi^T\hat{\theta}\} =$ |  | $-\dot{\epsilon} = \dot{\hat{\theta}} = f - A\hat{\theta} =$ |
|  | $= M^{-1}\phi\{y - \phi^T\hat{\theta}\} \equiv M^{-1}\phi \cdot \eta =$ |  | $= \int \phi y d\tau - [\int \phi\phi^T d\tau]\hat{\theta} = \zeta =$ |
|  | $= M^{-1}A \cdot e$ |  | $= M\theta - M\hat{\theta} = M \cdot e$ |

Because in the LSE case $A = \phi\phi^T$ is a rank 1, hence intrinsically singular matrix, whereas in the ZEE case the multiplier of $\epsilon$, namely M, is positive-definite, the first of the two differences between LSE and ZEE is clear, in that $\dot{\epsilon} \equiv 0$ without $\epsilon \equiv 0$ is possible in the former but not the latter. Furthermore, the fact that $\|M^{-1}(t)\| \to 0$ as t increases demonstrates the second fatal flaw in the LSE, namely that the "negative error feedback gain" continuously diminishes, leading to more and more sluggish convergence.

Now generalize the preceding slightly, to include both problem configurations 1 and 2, namely let y be an l-vector, let $\Phi$ be a $p \times l$ matrix, and let $\theta$ be a p-vector, so that the information sought is carried by the innovation (signal estimate error) $\eta = 0$, where $\eta \equiv y - \Phi^T\theta$. The equation $\eta = 0$ obviously (absolutely) minimizes the sum of squares $\sigma^2 \equiv \|\eta\|^2$ which defines the squared (Euclidean) length of the vector $\eta$; in the prior LSE art, one applies the LSE criterion to the instantaneous value of the quantity $\sigma^2$ to be minimized. By elementary vector-matrix algebra $$\sigma^2 = \|y\|^2 - 2\cdot(\Phi y)\cdot\theta + \theta\cdot\Phi\Phi^T\theta$$

whence computation of the gradient of $\sigma^2$ with respect to $\theta$, and setting $\theta$ equal to the minimizing value $\hat{\theta}$, produces the well-known necessary condition $$-\text{grad}_{(\theta)}(\sigma^2/2) = -\sigma\cdot\sigma_\theta = \Phi y - \Phi\Phi^T\cdot\hat{\theta} = \Phi\eta = 0.$$

(Note the obvious difficulty that it is possible for $\Phi\eta=0$ without $\eta=0$.) In the prior LSE art, the preceding equations are known as the normal equations corresponding to the problem of minimization of $\sigma^2/2$. Accordingly, one way to express the difference between the prior LSE art and the presently disclosed ZEE art is to summarize the preceding as follows:

In the prior LSE art one implements an Estimator/Identifier whose equilibrium points are solutions of the normal equations of the instantaneous least mean square solution of the information-bearing equation. But unfortunately the normal equations have infinitely many solutions, most of which do not correspond to correct parameter identifications. In the presently disclosed ZEE art, however, one first integrates the instantaneous normal equations in order to define an Estimator/Identifier whose sole, isolated equilibrium point thereby becomes defined in such a manner that it has a unique solution corresponding to perfect parameter identification.

This last explanation of the ZEE approach can be reformulated in such a way as to give the final illumination of the relationship between the extensive, but not entirely successful, prior LSE art and the presently disclosed, new ZEE art. Define the integrated LSE approach as one in which the criterion to be minimized is the integral $$\Sigma^2 = \int_0^t \sigma^2 d\tau.$$

Now the preceding calculation shows that the necessary condition for a minimum of $\Sigma^2/2$ is that $$-\text{grad}_{(\theta)}(\Sigma^2/2) = -\Sigma\cdot\Sigma_\theta = \int\Phi y\, d\tau - [\int\Phi\Phi^2\, d\tau]\cdot\theta = 0.$$

Accordingly, the ZEE Estimator/Identifier is simply the result of using known analog techniques to imbed the solution of the integrated LSE problem into a dynamical system as its sole equilibrium point, and one which is to be approached exponentially. From the presently disclosed point of view, it might be alleged that the ZEE algorithm could have been "derived" rather than "discovered" or "invented", simply by "systematic" exploitation of known concepts, and therefore it might be alleged (in retrospect) that the ZEE algorithm might appear to be an "obvious" discovery whose incorporation in an improvement of a known technology does not clearly rise to the level of invention required for patentability. But the falsity of such a conclusion is evidenced by two facts: (a) there have been literally hundreds of research projects and resulting published research papers attempting to improve the known state of the art in LSE parameter estimation, as witness the references in the four recent texts and monographs [1]-[4] cited above, yet none has discovered the presently highly desirable and advantageous approach [which in initial trials has converged many orders of magnitude faster than the standard techniques], despite intense, world-wide, highly-motivated and frequently well-financed efforts by scores of experts in this art to do so; and (b) the present inventor did not discover the preceding short route to the derivation of the ZEE Estimator/Identifier until long after he had already discovered it as a conjecture to be evaluated and, hopefully, verified (rather than as a methodology to be applied).

4. Relationship of Parameter Estimation and System Identification

Suppose now that one wishes to identify the parameters which define a standard LTI dynamical system, whose evolution in time is assumed to be governed by dynamics of the form $$\dot{x} = Ax + Bu + \Gamma v(t), \quad (61a)$$

$$z = Cx + Du + w(t), \quad (61b)$$

where the time-varying m-vector $u=u(t)$ is the input to the unknown system, and therefore known and recordable, and where the time-varying l-vector $z=z(t)$ is the unknown system's output, and therefore likewise assumed recordable. The dimension n of the system's state-vector x is assumed known, but $x(t)$ may not be directly measurable. Also the zero-mean Gaussian stochastic process disturbance $v(t)$ is not known, nor is the output measurement noise (sensor noise) $w(t)$ known either, though it may also be assumed to be a zero-mean Gaussian stochastic process. If either of the stochastic terms has a bias, this is absorbable into the system's dynamics by the well known expedient of adding a constant, whose rate of change is zero, to the state vector, i.e. adding an $(n+1)^{st}$ component $\xi$ whose dynamics is governed by $\dot{\xi}=0$.

It is well known in the subject of optimal stochastic estimation (optimal filtering) that an unbiased minimal variance estimate $\hat{x}$ of x can be generated online, in real time, by implementation of a Kalman-Bucy Filter; in the case of minimizing the variance as time increases without limit, there is a constant $n\times l$ matrix L (the steady-state Kalman-Bucy gain matrix) which can be computed by known procedures once the system parameters (A,B,C,D) are known, and allows implementation of the filter in the form $$\dot{\hat{x}} = A\hat{x} + Bu + L\tilde{z}, \quad \tilde{z} = z - \hat{z}, \quad (62a)$$

$$\hat{z} = C\hat{x} + Du, \quad (62b)$$

where the innovations process $\tilde{z}$ behaves like zero-mean white noise and therefore would be missing from the mean values of (62a,b). Consequently, we can write the mean values of the preceding filter dynamics in the form [after having applied some averaging process, such as a short-time-span, centered, moving average filter, to $y(t)$] of the second problem configuration above, namely in the form of (2), or of $$y(t) = ([\dot{\hat{x}}]^T, \hat{z}^T)^T = \Phi(t)\cdot\theta, \quad (63)$$

where $\Phi \equiv \Omega^T$ is defined by means of Kronecker products as follows:

$$\Phi = \begin{pmatrix} \Phi_1, & 0 \\ 0, & \Phi_2 \end{pmatrix}, \quad (64a)$$

$$\Phi_1 = I_n \otimes \hat{x}^T + I_n \otimes u^T, \quad (64b)$$
$$\Phi_2 = I_l \otimes \hat{x}^T + I_l \otimes u^T, \quad (64c)$$

and where the p-vector $\theta$ is defined by $$\theta = [vec(A),^T vec(B),^T vec(C),^T vec(D),^T]^T, \quad (64d)$$

where $p = n^2 + nm + ln + lm \equiv n \cdot (n+m) + l \cdot (n+m) \equiv (n+l) \cdot (n+m)$, and the vec operation is defined by stacking the columns of a matrix into a large vector, i.e. if $A = (a^1, \ldots, a^n)$, then $vec(A) \equiv [(a^1)^T, \ldots, (a^n)^T]^T$.

Upon applying the ZEE algorithm to (63), one obtains the case depicted in FIG. 2 and the dimensions specified in connection with the list of Reference Numerals in the Drawings. This result is an obvious generalization of an application to be published shortly by the present inventor in [5].

References

[1] K. J. Åström & B. Wittenmark, Adaptive Control, Addison-Wesley, Reading, Mass., 1989

[2] R. Middleton & G. Goodwin, Digital Control Estimation: A Unified Approach, Prentice-Hall, N.J., 1990

[3] S. Sastry & M. Bodson, Adaptive Control: Stability, Convergence and Robustness, Prentice-Hall, N.J., 1989

[4] J.-J. E. Slotine & Weiping Li, Applied Nonlinear Control, Prentice-Hall, N.J., 1991

[5] C. D. Johnson, "Some New Continuous-Time Parameter Estimators with Application to the Adaptive Control of a Space Launch Vehicle," to appear in Proceedings, 1991 American Control Conference, Session FP 10, Boston, Mass., June 26-28, 1991

Summary, Ramifications and Scope

The reader has seen that the improved ZEE Parameter Estimator/Identifier disclosed herein permits accurate and rapid identification of the parameters defining unknown LTI (Linear-Time Invariant) signal processes and dynamical systems under circumstances, such as smoothly varying or piecewise constant inputs $\Phi(t)$, wherein prior art Estimator/Identifiers can either fall catastrophically or else converge so sluggishly as to be useless.

This invention allows the design and production of Estimator/Identifiers which can be guaranteed in advance never to fail to converge, and to possess ZEE quality convergence.

The invention also allows the design and production of Parameter Estimator/Identifiers which can be guaranteed in advance to converge exponentially to an essentially perfect parameter identification.

Finally, this invention allows the design and production of Parameter Estimator/Identifiers which, in connection with the identification of signal processes and dynamical systems whose general operating characteristics and expected classes of inputs are generally known, permits the adjustment of a gain factor which will accelerate the rate of convergence as much as desired (consistent with the basic capabilities of the integration, computation, and measurement techniques and components employed in the invention's implementation).

Although the description above contains many specificities, these should not be construed as limiting the scope of the invention but as merely providing illustrations of some of the presently preferred embodiments of this invention [such as disclosed in Problem Configurations (1), (2), and (3) of the section on Theoretical Principles of Operation]. Readers conversant with the Parameter Estimation and/or System Identification art(s) will doubtless recognize that many obvious variations upon the preferred embodiments can be implemented without departing from the scope of the invention disclosed.

Thus the scope of the invention should be determined by the appended claims and their legal equivalents, rather than by the examples given.

I claim:

1. A parameter estimator/identifier system, characterized by a zero error equilibrium state, for application in signal detection systems, and, more generally, to adaptive signal processing, as in adaptive control systems, biomedical signal processing, medical and industrial fault detection, sonar/radar/optical signal processing, time-series analysis and prediction for resource allocation including identification of intrinsic market price-fluctuation dynamics, and other empirical dynamical system identification tasks to be performed by automated processing of either real-time or historical, but actual, input and output time-series data records, comprising:

a given empirical dynamical system defined by a substantially constant but unknown p-dimensional physical parameter-vector $\theta$ whose value is sought to be estimated or identified, and which operates upon given time-varying m-vector input signals u(t) to produce l-vector output signals z(t);

means for recording and transmitting said m-vector input signals u(t) for each time t in a given range of operating times $0 \leq t \leq T$;

means for recording and transmitting said l-vector output signals z(t) for each such time t;

preprocessor filtering means for accepting as inputs said recorded and transmitted signals u and z as well as p-vector signals $\hat{\theta}(t)$ constituting instantaneous feedback of current estimates of the unknown parameter-vector $\theta$, and for producing as outputs a filter signal q-vector y(t) and a filter carrier or regressor signal (p×q)-matrix $\Phi(t)$, said filtering means being so designed by known techniques that said filter signal is a linear function of both said carrier signal and said unknown parameter-vector, and, more specifically, has the characteristic that $$y(t) = \Phi(t)^T \cdot \theta,$$

where the superscript $T$ denotes vector-matrix transposition, thereby defining a theoretical q-vector signal estimate error or innovations signal process $$\eta = y(t) - \Phi(t)^T \cdot \hat{\theta}(t),$$

and a corresponding scalar-magnitude squared-error signal process $$\sigma^2 = {}^2||\eta||^2 = \eta^T \cdot \eta,$$

wherein there is assumed to exist a positive integer n such that $$q = n+l, \ p = (n+m) \cdot (n+l);$$

and a zero error equilibrium parameter-estimation processing means for accepting as inputs said filter signal y(t) and said filter carrier signal Φ(t) and for producing as an output, which is also fed back to said preprocessing filter means, an estimate $\hat{\theta}(t)$ of said unknown physical parameter-vector $\theta$, the provision for zero error equilibrium comprising the replacement of the known design criterion for said parameter-estimation processing means, namely the minimization of said squared-error at each instant of time, by the improved criterion of minimizing the time-integral $\Sigma^2$ of said squared-error, namely $$\Sigma^2 = \int_o^t \sigma^2 d\tau,$$

said improvement eliminating the usual requirement that, in order for said parameter-estimation processing means to operate successfully, in the sense that the identification error $\|\theta - \hat{\theta}\|^2$ rapidly decreases to a relatively negligible amount, said input signal u(t) must include dithering or other unnecessary artificial stimulation or excitation of said dynamical system in order to produce the dithering or excitation of said carrier signal, Φ(t) without which the unimproved use of said known criterion can lead to erratic and sluggish adaptation and even catastrophic failure of such unimproved parameter-estimation processing means, in contrast to said improvement with which, and even without unnecessary maneuvering or dithering or excitation, that is, even without the requirement of persistently acting inputs, there is always achieved guaranteed uniform global exponential convergence of the identification error to effective negligibility with respect to available measurement and computational capabilities.

2. The parameter estimator/identifier system of claim 1, wherein said zero error equilibrium parameter-estimation processing means additionally comprises:
   first sub-processor means;
   second sub-processor means;
   third sub-processor means;
   fourth sub-processor means;
   fifth sub-processor means;
   sixth sub-processor means;
   seventh sub-processor means;
   eighth sub-processor means;
   ninth sub-processor means; and
   tenth sub-processor means;
   said first sub-processor means accepting as inputs said filter signal y and said filter carrier Φ, and producing as output the input to said second sub-processor means;
   said second sub-processor means producing as output an input to said third sub-processor means;
   said third sub-processor means accepting as inputs outputs of both said second sub-processor means and of said ninth sub-processor means, and producing as output an input to said fourth sub-processor means;
   said fourth sub-processor means accepting as inputs outputs of both said third sub-processor means and of said tenth sub-processor means, and producing as output the input to said fifth sub-processor means;
   said fifth sub-processor means producing as output said parameter estimate $\hat{\theta}$, which is also fed back as an input to said ninth sub-processor means;
   said sixth sub-processor means accepting as an input said filter carrier Φ and producing as output an input to said seventh sub-processor means;
   said seventh sub-processor means accepting as inputs both said filter carrier Φ and the output of said sixth sub-processor means, and producing as output the input to said eighth sub-processor means;
   said eighth sub-processor means producing as output an input to said ninth sub-processor means which is also the input to said tenth sub-processor means;
   said ninth sub-processor means accepting as inputs both the output of said eighth sub-processor means and the fed back output of said fifth sub-processor means, and producing as output an input to said third sub-processor means; and
   said tenth sub-processor means accepting as input the output of said eighth sub-processor means and producing as output an input to said fourth sub-processor means;
   whereby the combination of said preceding sub-processor means functions interactively to guarantee said zero error equilibrium state.

3. The parameter estimator/identifier system of claim 2, wherein said zero error equilibrium parameter-estimation sub-processing means additionally comprise:
   said first sub-processor means comprising matrix-vector multiplication means;
   said second sub-processor means comprising vector integration means;
   said third sub-processor means comprising vector subtraction means;
   said fourth sub-processor means comprising matrix-vector multiplication means accompanied by scalar gain-factor multiplication means;
   said fifth sub-processor means comprising vector integration means;
   said sixth sub-processor means comprising matrix transposition means;
   said seventh sub-processor means comprising matrix-matrix multiplication means;
   said eighth sub-processor means comprising matrix integration means;
   said ninth sub-processor means comprising matrix-vector multiplication means; and
   said tenth sub-processor means comprising matrix normalization means, wherein every element of said matrix is divided by the sum of the diagonal elements of said matrix, thereby providing a normalized matrix, none of whose characteristic values exceeds unity.

4. A method for parameter estimation/identification, characterized by a zero error equilibrium property, for application to signal detection systems and, more generally, to adaptive signal processing, as in adaptive control systems, biomedical signal processing, medical and industrial fault detection, sonar/radar/optical signal processing, time-series analysis and prediction for resource allocation including identification of intrinsic market price-fluctuation dynamics, and other empirical dynamical system identification tasks to be performed by automated processing of either real-time or historical, but actual, input and output time-series data records, comprising the steps of:

accepting any given empirical dynamical system defined by a substantially constant but unknown p-vector physical parameter-vector $\theta$ whose value is sought to be estimated or identified, and which operates upon given time-varying m-vector input signals u(t) to produce l-vector output signals z(t);

recording and transmitting said m-vector input signals u(t) for each time t in a given range of operating times $0 \leq t \leq T$;

recording and transmitting said l-vector output signals z(t) for each such time t;

pre-processing/filtering said signals u and z as well as p-vector signals $\hat{\theta}(t)$ constituting instantaneous feedback of current estimates of the unknown parameter-vector $\theta$, for producing as outputs a filter signal q-vector y(t) and a filter carrier or regressor signal $(p \times q)$-matrix $\Phi(t)$, said filtering being so designed by known techniques that said filter signal is a linear function of both said carrier signal and said unknown parameter-vector, and, more specifically, has the characteristic that $$y(t) = \Phi(t)^T \cdot \theta,$$

where the superscript $T$ denotes vector-matrix transposition, thereby defining a theoretical q-vector signal estimate error or innovations signal process, $$\eta \equiv y(t) - \Phi(t)^T \cdot \hat{\theta}(t),$$

and a corresponding scalar-magnitude squared-error signal process $$\sigma^2 \equiv \|\eta\|^2 \equiv \eta^T \cdot \eta,$$

wherein there is assumed to exist a positive integer n such that $$q = n + l, \; p = (n + m) \cdot (n + l);$$

and providing a zero error equilibrium parameter-estimation processing step for accepting as inputs said filter signal y(t) and said filter carrier signal $\Phi(t)$ and for producing as an output, which is also fed back to said preprocessing/filtering step, an estimate $\hat{\theta}(t)$ of said unknown physical parameter-vector $\theta$, the provision for zero error equilibrium comprising the replacement of the known design criterion for said parameter-estimation processing step, namely the minimization of said squared-error at each instant of time, by the improved criterion of minimizing the time-integral $\Sigma^2$ of said squared-error, namely $$\Sigma^2 \equiv \int_0^t \sigma^2 d\tau,$$

said improvement eliminating the usual requirement that, in order for said parameter-estimation processing step to operate successfully, in the sense that the identification error $\|\theta - \hat{\theta}\|^2$ rapidly decreases to a relatively negligible amount, said input signal u(t) must include dithering or other unnecessary artificial stimulation or excitation of said dynamical system in order to produce the dithering or excitation of said carrier signal $\Phi(t)$ without which the unimproved use of said known criterion can lead to erratic and sluggish adaptation and even catastrophic failure of such an unimproved parameter-estimation processing step, in contrast to said improvement with which, and even without unnecessary maneuvering or dithering or excitation, that is, even without the requirement of persistently acting inputs, there is always achieved guaranteed uniform global exponential convergence of the identification error to effective negligibility with respect to available measurement and computational capabilities.

5. The method for parameter estimation/identification of claim 4, wherein said said step of providing a zero error equilibrium parameter-estimation processing step additionally comprises the sub-processing steps of:

providing a first sub-processing step;
providing a second sub-processing step;
providing a third sub-processing step;
providing a fourth sub-processing step;
providing a fifth sub-processing step;
providing a sixth sub-processing step;
providing a seventh sub-processing step;
providing an eighth sub-processing step;
providing a ninth sub-processing step; and
providing a tenth sub-processing step;

said first sub-processing step accepting as inputs said filter signal y and said filter carrier $\Phi$, and producing as output the input to said second sub-processing step;

said second sub-processing step producing as output an input to said third sub-processing step;

said third sub-processing step accepting as inputs outputs of both said second sub-processing step and of said ninth sub-processing step, and producing as output an input to said fourth sub-processing step;

said fourth sub-processing step accepting as inputs outputs of both said third sub-processing step and of said tenth sub-processing step, and producing as output the input to said fifth sub-processing step;

said fifth sub-processing step producing as output said parameter estimate $\hat{\theta}$, which is also fed back as an input to said ninth sub-processing step;

said sixth sub-processing step accepting as an input said filter carrier $\Phi$ and producing as output an input to said seventh sub-processing step;

said seventh sub-processing step accepting as inputs both said filter carrier $\Phi$ and the output of said sixth sub-processing step, and producing as output the input to said eighth sub-processing step;

said eighth sub-processing step producing as output an input to said ninth sub-processing step which is also the input to said tenth sub-processing step;

said ninth sub-processing step accepting as inputs both the output of said eighth sub-processing step and the fed back output of said fifth sub-processing step, and producing as output an input to said third sub-processing step; and said tenth sub-processing step accepting as input the output of said eighth sub-processing step and producing as output an input to said fourth sub-processing step;

whereby the combination of said preceding sub-processing steps functions interactively to guarantee said zero error equilibrium property of said parameter-estimation processing step.

6. The method for parameter estimation/identification of claim 5, wherein said said step of providing a zero error equilibrium parameter-estimation processing step, additionally comprising said sub-processing steps, further includes provision for:

said first sub-processing step to comprise matrix-vector multiplication;

said second sub-processing step to comprise vector integration;

said third sub-processing step to comprise vector subtraction;

said fourth sub-processing step to comprise matrix-vector multiplication accompanied by the step of subsequent amplification by a selected scalar gain factor;

said fifth sub-processing step to comprise vector integration;

said sixth sub-processing step to comprise matrix transposition;

said seventh sub-processing step to comprise matrix-matrix multiplication;

said eighth sub-processing step to comprise matrix integration;

said ninth sub-processing step to comprise matrix-vector multiplication; and said tenth sub-processing step to comprise matrix normalization, wherein every element of said matrix is divided by the sum of the diagonal elements of said matrix, thereby providing a normalized matrix, none of whose characteristic values exceeds unity.

* * * * *